UNITED STATES PATENT OFFICE.

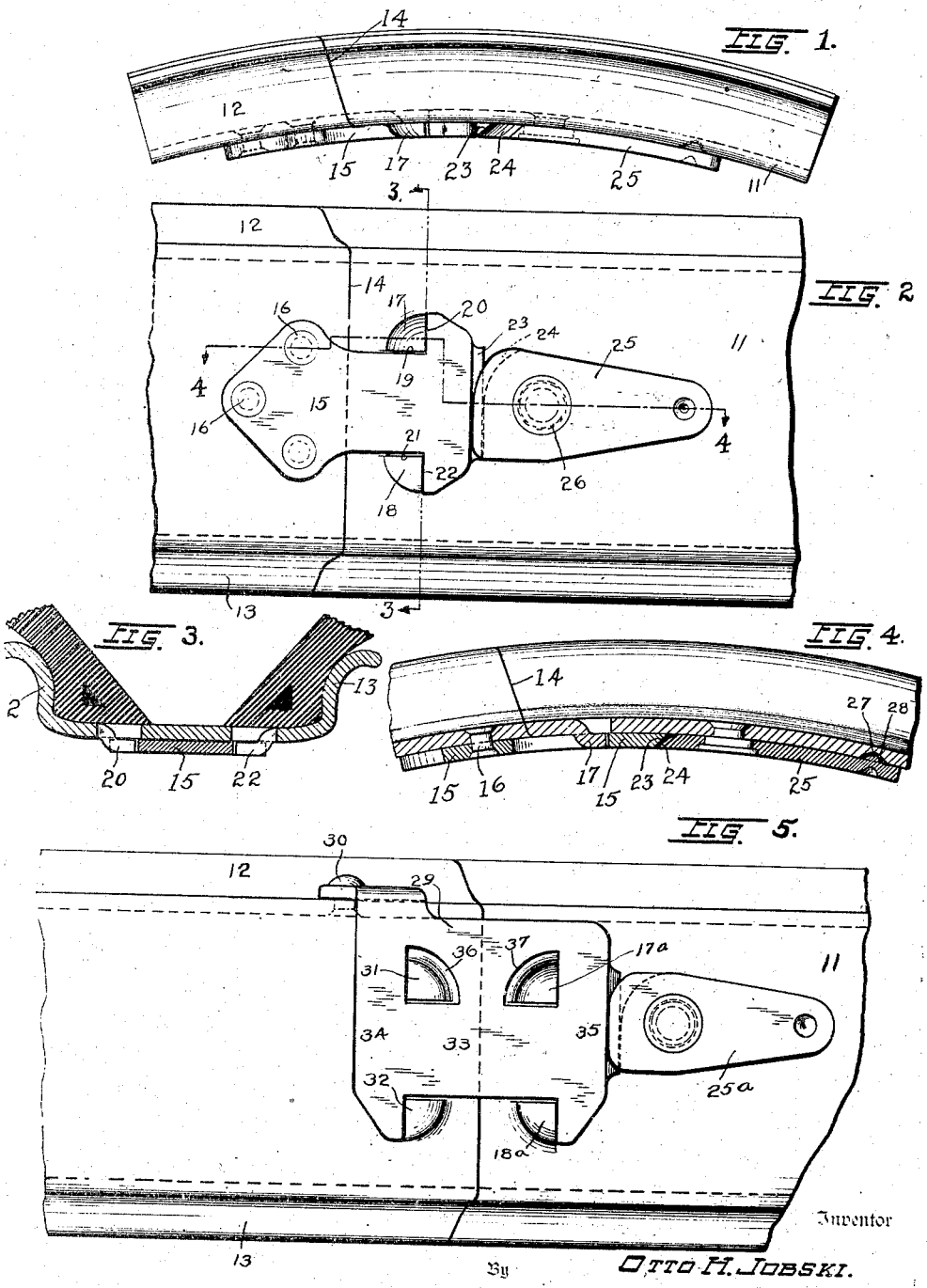

OTTO H. JOBSKI, OF CLEVELAND, OHIO, ASSIGNOR TO THE STANDARD PARTS COMPANY, OF CLEVELAND, OHIO, A CORPORATION OF OHIO.

RIM.

1,329,768.      Specification of Letters Patent.      Patented Feb. 3, 1920.

Application filed June 9, 1919. Serial No. 302,309.

*To all whom it may concern:*

Be it known that I, OTTO H. JOBSKI, a citizen of the United States, and a resident of Cleveland, county of Cuyahoga, State of Ohio, have invented certain new and useful Improvements in Rims, of which the following is a specification.

This invention relates to demountable rims for vehicle wheels and more particularly to rims which are transplit to facilitate the placing of a tire thereon or its removal therefrom. One object of the invention is to provide a rim of this type with means for locking the ends of the rim together, which will be of simple, strong and light construction, effectual in operation and capable of economical manufacture.

Other objects of the invention and the features of novelty will be apparent from the following description, taken in connection with the accompanying drawings, in which:—

Figure 1 is a fragmentary side elevation of a rim embodying my invention;

Fig. 2 is a fragmentary bottom plan view of the structure shown in Fig. 1;

Fig. 3 is a cross-section on the line 3—3 of Fig. 2, the beads of a tire which is mounted on the rim being shown in cross-section;

Fig. 4 is a cross-section on the line 4—4 of Fig. 2; and

Fig. 5 is a fragmentary bottom plan view similar to Fig. 2, but showing a modified structure, embodying my invention.

In the structure shown in Figs. 1 to 4, 11 indicates a vehicle wheel rim having side flanges 12 and 13 integral therewith, the rim and flanges being transplit, as shown at 14, the split being preferably at a slight angle to the radial line to that point. To one end of the rim, a substantially T shaped latch plate 15 is attached in any suitable manner, as, for instance, by rivets 16, and extends across the split 14 overlapping the other end of the rim on the inner side thereof. The other end of the rim 11 is provided with a pair of integral lugs 17 and 18 which are stamped-up from the material of the rim and extend radially inwardly therefrom, the body of the metal being cut through to form abrupt faces 19 and 20 on the lug 17 and similar faces 21 and 22 on the lug 18. The faces 19 and 21 of the lugs 17 and 18, respectively, are opposed and engage the opposite sides of the latch plate 15 to hold the ends of the rim from relative lateral motion, and the abrupt faces 20 and 22 of the lugs 17 and 18, respectively, are substantially in alinement and engage corresponding faces on the head of the T shaped latch plate 15, whereby the ends of the rim 11 are held from separation in a circumferential direction.

The end of the latch plate 15 is beveled, as shown at 23, and is engaged by a corresponding beveled surface 24 on the locking lever 25, which is pivoted at 26 to the rim 11, the locking lever 25 being formed with a slight projection 27 which is adapted to enter a correspondingly formed recess 28 in the rim 11 to secure the lever in its locked position. It will be understood that when the tire has been placed in position upon the rim, the end of the rim which carries the latch plate 15 is moved radially outwardly relative to the other end of the rim, the body of the latch plate engaging between the lugs 17 and 18 and the lateral extensions engaging the surfaces 20 and 22 of the lugs 17 and 18, respectively, after which the locking lever 25 is turned to the position shown in Fig. 2 to hold the parts in fixed relative position. It will be noted that the lugs 17 and 18 are so positioned as to underlie the beads of the tire so that the openings in the rim, caused by the formation of the lugs, will be covered by the beads and there will be no tendency to injure the inner tube.

In the modified structure shown in Fig. 5, each end of the rim 11 is provided with a pair of lugs identical in construction with the lugs 17 and 18 shown in Fig. 2. The end of the rim which is provided with lugs 17ª and 18ª is also provided with a locking lever 25ª, which is pivotally mounted on the rim 11 in the same manner and for the same purpose as the locking lever 25 shown in Fig. 2. The other end of the rim, on which the lugs 31 and 32 are formed, carries a latch plate 29 which is pivotally secured to the side flange 12 by a rivet 30. This pivoted latch plate 29 comprises a body portion 33, which is adapted to engage between the lugs 31 and 32 on one end of the rim and between the lugs 17ª and 18ª on the other end of the rim, and lateral extensions 34 and 35 at the ends of the body portion 33 which are adapted to engage, respectively, with the lugs 31 and 32 and with the lugs 17ª and 18ª. In order to make the structure more substantial, the ends of the lateral extensions 34 and 35, adjacent to that edge of the latch plate 29 at which it is pivotally attached to the side flange, are preferably joined together and the latch plate is provided with openings 36 and 37 so that it can engage with the lugs 31 and 17ª.

When the tire has been placed in position on the rim, and the ends of the rim have been brought into proper abutting relation, the latch plate 29 is swung in the plane of the rim so as to engage the lugs 17ª, 18ª, 31 and 32, and the locking lever 25ª is moved to the position shown in Fig. 5, to engage the latch plate 29 and hold it in place.

Having thus described my invention, what I claim is:

1. A transplit vehicle wheel rim, having a latch secured to one end thereof comprising a body portion extending across the split in the rim and a head extending laterally from the body portion, said rim having a lug stamped up from the material of the rim adjacent its other end and engaging said latch in the corner between the body portion and the head thereof.

2. A transplit vehicle wheel rim, having a stamped-up lug integral therewith adjacent one end thereof, and a latch carried by the other end of said rim and extending across the split in the rim, said lug being engaged by said latch to hold the ends of the rim from relative lateral motion.

3. A transplit vehicle wheel rim, having a pair of spaced stamped-up lugs integral with the rim adjacent one end thereof, and a latch carried by the other end of the rim and having a head extending in opposite directions from the body portion of the latch, said lugs engaging said latch in the corners between the body portion and head thereof.

4. A transplit vehicle wheel rim, having a stamped-up lug integral therewith adjacent one end thereof, a latch carried by the other end of said rim extending across the split in the rim and having a laterally extended portion engaging said lug whereby the ends of the rim are held together circumferentially, and a locking lever pivoted to the first-mentioned end of the rim and engaging said latch to hold the ends of the rim from relative radial motion.

5. A transplit vehicle wheel rim, having a lug stamped up from the material of the rim adjacent one end thereof, a latch carried by the other end of said rim and extending across the split in the rim, said lug having angularly disposed edges engaged by said latch whereby the ends of said rim are held from relative lateral and circumferential motion, and a locking lever pivoted to said rim and engaging said latch, whereby the ends of the rim are held from relative motion radially.

6. A transplit vehicle wheel rim, having a pair of lugs adjacent one end thereof, and a latch pivotally secured to the other end of the rim so as to swing in the plane of the rim and having a head extending in opposite directions from its body portion, said lugs engaging said latch in the corners between the body portion and head thereof.

7. A transplit vehicle wheel rim, having a pair of lugs stamped up from the material of the rim adjacent each end thereof, a latch pivotally secured to one end of the rim and movable so as to engage all of said lugs, and means carried by the other end of the rim for holding said latch in engaging position.

In testimony whereof I affix my signature.

OTTO H. JOBSKI.